(12) United States Patent
Bourdelais et al.

(10) Patent No.: US 7,543,974 B2
(45) Date of Patent: Jun. 9, 2009

(54) LIGHT REDIRECTING FILM HAVING VARIABLE THICKNESS

(75) Inventors: Robert P. Bourdelais, Pittsford, NY (US); John C. Brewer, Rochester, NY (US); Charles M. Rankin, Jr., Penfield, NY (US); Esther M. Betancourt, Rochester, NY (US)

(73) Assignee: SKC Haas Display Films Co., Ltd., Choongchungnamdo (KR)

( * ) Notice: Subject to any disclaimer, the term of this patent is extended or adjusted under 35 U.S.C. 154(b) by 0 days.

(21) Appl. No.: 11/682,329

(22) Filed: Mar. 6, 2007

(65) Prior Publication Data
US 2008/0219027 A1 Sep. 11, 2008

(51) Int. Cl.
*F21V 7/09* (2006.01)
(52) U.S. Cl. .................. 362/627; 362/618; 362/622; 362/624; 362/560; 362/561
(58) Field of Classification Search .............. None
See application file for complete search history.

(56) References Cited

U.S. PATENT DOCUMENTS

| | | | |
|---|---|---|---|
| 5,886,760 A * | 3/1999 | Ueda et al. ............... 349/95 |
| 5,919,551 A * | 7/1999 | Cobb et al. .............. 428/156 |
| 6,077,560 A | 6/2000 | Moshrefzadeh et al. |
| 6,132,942 A * | 10/2000 | Woodworth et al. ........ 430/496 |
| 6,354,709 B1 | 3/2002 | Campbell et al. |
| 6,583,936 B1 | 6/2003 | Kaminsky et al. |
| 6,721,102 B2 | 4/2004 | Bourdelais et al. |
| 6,906,761 B2 * | 6/2005 | Nakano ................. 349/65 |
| 7,138,170 B2 * | 11/2006 | Bourdelais et al. ........ 428/188 |
| 2001/0053075 A1 * | 12/2001 | Parker et al. ............ 362/31 |
| 2002/0044351 A1 | 4/2002 | Nilsen |
| 2004/0012570 A1 | 1/2004 | Cross et al. |
| 2005/0024754 A1 | 2/2005 | Epstein et al. |
| 2005/0030630 A1 * | 2/2005 | Ohnishi et al. ........... 359/599 |
| 2005/0047112 A1 | 3/2005 | Chen et al. |
| 2005/0140860 A1 | 6/2005 | Olczak |
| 2005/0174646 A1 | 8/2005 | Cowan et al. |
| 2005/0276949 A1 * | 12/2005 | Bourdelais et al. ........ 428/141 |
| 2006/0092490 A1 * | 5/2006 | McCollum et al. ......... 359/24 |
| 2006/0133109 A1 * | 6/2006 | Kim et al. ............... 362/615 |

FOREIGN PATENT DOCUMENTS

WO 98/50806 5/1997

OTHER PUBLICATIONS

John C. Brewer, et al., "Light Redirecting Film Having Discontinuous Coating", U.S. Appl. 11/682,335, filed Mar. 6, 2007.

* cited by examiner

*Primary Examiner*—Sandra L O'Shea
*Assistant Examiner*—Danielle Allen
(74) *Attorney, Agent, or Firm*—Edwin Oh (57) ABSTRACT

A display comprises a light source and a light redirecting polymeric film containing a structured surface on at least one side of the film and bearing a polymeric coating over at least part of the structured surface wherein the coating exhibits a variable thickness.

28 Claims, 6 Drawing Sheets

LIGHT REDIRECTING FILM HAVING VARIABLE THICKNESS

FIELD OF THE INVENTION

This invention relates to the formation of a light redirecting polymeric film comprising a plurality of surface structures containing a polymeric coating. In particular, a light redirecting film having a wide, uniform light output suitable for directing light energy in LCD display devices.

BACKGROUND OF THE INVENTION

Light redirecting films are typically thin transparent optical films or substrates that redistribute the light passing through the films such that the distribution of the light exiting the films is directed more normal to the surface of the films. Typically, light redirecting films are provided with ordered prismatic grooves, lenticular grooves, or pyramids on the light exit surface of the films which change the angle of the film/air interface for light rays exiting the films and cause the components of the incident light distribution traveling in a plane perpendicular to the refracting surfaces of the grooves to be redistributed in a direction more normal to the surface of the films. Such light redirecting films are used, for example, to improve brightness in liquid crystal displays (LCD), laptop computers, word processors, avionic displays, cell phones, PDAs and the like to make the displays brighter. Previous light redirecting films suffer from visible Moiré patterns when the light redirecting film is used with a liquid crystal or other display. The surface elements of the light redirecting film interact with other optical films utilized in backlight assemblies, the pattern of printed dots or three-dimensional elements on the back of the light guide plate, or the pixel pattern inside the liquid crystal section of the display to create Moiré, an undesirable effect. Methods known in the art for reducing Moiré have been to die cut the light redirecting films such that the lenticular array is not normal to any side of the sheet. This makes the lenticular array be at an angle relative to another light redirecting film or to the display electronics. Methods also used include randomizing the linear array by widths of the linear array elements, to vary the height along the linear array periodically, to add a diffusing layer on the opposite side of the linear array on the film, or to round the ridges of the linear array. The above techniques to reduce Moiré also cause a decrease in on-axis brightness or do not work to adequately solve the Moiré problem. Moiré and on-axis brightness tend to be related, meaning that a film with high on-axis gain would have high Moiré in a system. It would be beneficial to be able to reduce the Moiré while maintaining sufficient on-axis gain.

In addition, there are relatively few numbers of light redirecting films compared with the numbers of liquid crystal display configurations. Each display configuration was selected to fill a desired output. The amount of on-axis gain, viewing angle, Moiré reduction, and total light output were all tailored by combining different films in different configurations. The light redirecting film used in the systems is limited because there are only a few different light redirecting surface textures available. It would be desirable to have a light redirecting film that was customizable to the desired output of the display device.

Typical light directing films provide high on-axis illumination at the expense of illumination at angles between 40 and 90 degrees from the normal. These high, on-axis light directing films are useful for portable display devices such as laptop computers and games were a high on-axis brightness lessens the power consumption for batteries and provides for some level of viewing privacy. For some TV and monitor applications that are intended for public viewing, high brightness over a wide range of viewing angles allows for consistent viewing of images and video. It would be desirable to have a light directing film that could provide high brightness over a wide range of viewing angles.

U.S. Pat. No. 5,919,551 (Cobb, Jr. et al) claims a linear array film with variable pitch peaks and/or grooves to reduce the visibility of Moiré interference patterns. The pitch variations can be over groups of adjacent peaks and/or valleys or between adjacent pairs of peaks and/or valleys. While this varying of the pitch of the linear array elements does reduce Moiré, the linear elements of the film still interact with the dot pattern on the backlight light guide and the electronics inside the liquid crystal section of the display.

U.S. Pat. No. 6,354,709 discloses a film with a linear array that varies in height along its ridgeline and the ridgeline also moves side to side. While the film does redirect light and its varying height along the ridgeline slightly reduces Moiré, it would be desirable to have a film that significantly reduces the Moiré of the film when used in a system while maintaining a relatively high on-axis gain.

US application 2001/0053075 (Parker et al.) discloses the use of individual surface structures for the redirecting of light to create high on-axis gain in a LCD device.

U.S. Pat. No. 6,721,102 (Bourdelais et al.) discloses a visible light diffuser formed with complex polymer lenses. The complex lenses disclosed in U.S. Pat. No. 6,721,102 are created by adding micrometer sized polymer lenses on the surface of low aspect ratio polymer base lenses. The ratio of smaller lenses to large lens is between 2:1 to 30:1. The diffuser disclosed in U.S. Pat. No. 6,721,102 is useful for diffusing light sources, in particular, LCD backlight sources.

U.S. Pat. No. 6,583,936 (Kaminsky et al) discloses a patterned roller for the micro-replication of light polymer diffusion lenses. The patterned roller is created by first bead blasting the roller with multiple sized particles, followed by a chroming process that creates micro-nodules. The manufacturing method for the roller is well suited for light diffusion lenses that are intended to diffuse incident light energy.

US Application 2005/00247554 (Epstein et al.) discloses surface structures that are coated with a matrix polymer contain polymer beads preferably having a diameter of between 2 and 5 micrometers to create random scattering.

US Application 2005/0047112 (Chen et al.) discloses a light guide plate with prisms formed on the surface of the light guide plate. The surface of the prisms contain a coated inorganic nano-particle layer consisting of titanium dioxide, silicone dioxide or aluminum oxide to scatter transmitted light.

US Application 2005/0140860 (Olczak) discloses an optical film defined by a first surface structure function modulated by a second surface structure such that the first surface acts to diffuse light incident on the film and the second surface also functions to diffuse incident light.

US Application 2005/0174646 (Cowan et al.) discloses a reflective diffuser, which transmits or reflects incident light into a specific range of angles.

U.S. Application 2002/0044351 (Nilsen) discloses a polarizer comprising a sub-wavelength microstructures that are partially covered with a light transmissive inhibiting surface for polarizing light. The inhibiting surface can also comprise a reflective surface such as a metalized coating.

U.S. Pat. No. 6,077,560 (Moshrefzadeh et al) discloses a method of selectively printing a structured substrate without the use of a mask. The method includes coating the structured surface with a filler material such that the structured surface is covered.

U.S. Patent Application 2004/0012570 (Cross et al) discloses a resistive touch screen comprising a microstructured surface that is uniformly coated with an electrically conductive layer.

WO 98/50806 discloses a brightness enhancement article comprising a rounded prism structure and light scattering protrusions to increase the optical gain of incident light. It has been found that the scattering protrusions described in WO 98/50806 tends to result in unwanted abrasion of adjacent surfaces and the rounded prism tend to scratch resulting in unwanted cosmetic defects.

Problem to be Solved by the Invention

There is a need to provide a light redirecting film that provides high brightness over a wide range of viewing angles.

SUMMARY OF THE INVENTION

The invention provides a light source and a light redirecting polymeric film containing a structured surface on at least one side of the film and bearing a polymeric coating over at least part of the structured surface wherein the coating exhibits a variable thickness. The invention also provides a light redirecting film that comprises a light exit surface bearing (a) a surface structures and (b) a polymeric coating containing microbeads and a binder disposed over the surface structures wherein said light redirecting film has an optical gain of at least 1.20.

Advantageous Effect of the Invention

The invention provides an optical device comprising a light redirecting film having high brightness over a wide range of viewing angles.

BRIEF DESCRIPTION OF THE DRAWINGS

The invention is best understood from the following detailed description when read with the accompanying drawing figures. It is emphasized that the various features are not necessarily drawn to scale.

DETAILED DESCRIPTION OF THE INVENTION

The invention has numerous advantages compared to current light redirecting films. The invention provides high levels of brightness over a wide range of viewing angles. This combination of high brightness and wide viewing angles is well suited for the LCD TV and monitor market. High brightness allows for efficient utilization of LCD backlight energy and wide viewing angles ensure even, uniform brightness of the LCD image over a wide range of viewing angles typical of monitors and TV applications. Further, the film provides a softer angular cut-off compared to prior art light directing films. Prior art light directing films have a hard angular cut-off causing illumination to change dramatically over a few degrees. While this hard angular cut-off is acceptable or even preferred for personal viewing devices such as laptop computers, hard angular cut-off can cause a reduction in image quality for LCD devices that are viewed over larger angles such as TV and public view monitors.

The polymeric coating applied to the surface of the surface structures allows more incident light to pass through the light redirecting film compared to prior art light redirecting films. It has been found that the polymeric coating applied to the outermost surface of the surface structures "frustrates" or reduces the amount of total internal reflection in the light redirecting film. The frustration of the total internal reflection of the light redirecting film results in between 5 and 14% higher light output compared to the same light redirecting film without the polymeric coating.

The film's individual surface structures' and placement on the film balances the tradeoff between Moiré reduction and on-axis gain producing relatively high on-axis gain while significantly reducing Moiré. Moiré patterns result when two or more regular sets of lines or points overlap. It results in a pattern of repeating lines or shapes, the line size and frequency depending on the two patterns interacting. In a display device such as an LCD display, Moiré patterns that can be observed by the viewer of the LCD device are objectionable as they interfere with the quality of the displayed information or image. The light redirecting film of the invention reduces Moiré compared to prior art light redirecting films while maintaining the amount of on-axis gain. The size and shape distributions of the individual elements and polymeric coating can be customized for each display or viewing application.

Furthermore, the light redirecting film of the invention can be customized to the light source and light output of the light guide plate in order to more efficiently redirect the light. The individual surface structures make the film very flexible in design parameters, allowing different individual surface structures of different size, shape or orientation to be used throughout the film surface to process the light entering the film the most efficiently. For example, if the light output as a function of angle was known for all points on the light guide plate, a light redirecting film using individual surface structures having different shapes, sizes, or orientation could be designed to efficiently process the light exiting the light guide plate.

Newton rings occur when two reflective surfaces (for example light redirecting films or other optical films in a liquid crystal display) are close enough to each other that the distance starts to approximate the wavelength of light. Photons reflect between the two surfaces as well as passing through them, creating interference effects. Newton rings are undesirable to a viewer through a liquid crystal display. The film of the invention reduces Newton rings by having a percentage of the individual elements extend above other elements on the light redirecting film.

The film of the invention has a larger effective pitch with multiple sized elements than a light redirecting film with only one sized element. Having a larger effective pitch means that film will have higher on-axis gain than the more overlapped film with the same size land, or manufacturing tolerances could be lessened such that the land could become larger to have the same on-axis performance as the more overlapped film. Lessening the manufacturing tolerances could increase productivity of manufacturing the film.

The invention utilizes polymers for the base sheet and binder that resist scratching and abrasion and have been shown to be mechanically tougher compared to other prior art delicate light redirecting films constructed from UV cured polyacrylate. Further, the polymer coating that alters the output of the structured surface generally resides in the valley areas of the protective structured surface. The polymer coating is protected from undesirable scratching, abrasion and handling damage typical of LCD display systems because the surface structure protects the coating in the valley areas.

The invention utilizes a combination of coating technology and polymer formulation to provide a robust optical output signal. As both the coating process and polymer materials experience natural, statistically normal variability, the variability of the output optical signal of the invention is small in comparison. This allows the invention materials to be more easily manufactured compared to the difficult process of controlling the many process variables associated with precision polymer light re-directing lenses. Additionally, the lower optical output signal variability results in a high quality, precise display device that is consistent with high definition TV signals, blue ray input or gaming graphics.

Embodiments of the invention may also provide low coefficient of friction surface, reduced dielectric constant, abrasion resistance, increased stiffness, lower scattering, improved Moiré, higher light output and improved coloration. These and other advantages will be apparent from the detailed description below.

As used herein, "transparent" means the ability to pass radiation without significant deviation or absorption. For this invention, "transparent" material is defined as a material that has a spectral transmission greater than 90%. The term "light" means visible light. The term "polymeric film" means a film comprising polymers. The term "polymer" means homopolymers, block co-polymers, co-polymers and polymer blends. As used herein, the term microbead means a bead that is circular to elliptical in cross-section that has a diameter or major axis of from 0.1 to 30 micrometers.

Individual surface structures, in the context of an optical film, mean elements of a well-defined shape that can be projections or depressions in the optical film. Individual surface structures are small relative to the length and width of an optical film. The term "curved surface" is used to indicate a three dimensional element on a film that has curvature in at least one plane. "Wedge shaped elements" is used to indicate an element that includes one or more sloping surfaces, and these surfaces may be combination of planar and curved surfaces. The term "surface structures" is used to indicate a well-defined, purposeful structure present on the surface on a polymer film. "Surface structures" have a measurable size and are used to modify light energy entering and/or exiting the surface of a polymer film. The term "light entry surface" is used to indicate the surface of an optical film that light energy enters. In a liquid crystal display device, the light entry surface is the side facing the illumination light source. The term "light exit surface" is used to indicate the surface of the optical film that light exits. In a liquid crystal display device, the light exit surface is the side facing the liquid crystal cells.

The term "optical film" is used to indicate a thin polymer film that changes the nature of transmitted incident light. For example, a redirecting optical film provides an optical gain (output/input) greater than 1.0. The Optical Gain (OG) of a light management material is defined as the luminance of the light management material divided by the reference input luminance. Given that light distributions are rarely isotropic, this ratio is typically computed for specific angular coordinates (theta and phi). It is customary in the art to represent a subset of these ratios by plotting two cross-sectional graphs: one at phi=0 and the other at phi=90, while theta varies continuously from −80 to +80 degrees. "On-axis gain" is defined as output light intensity perpendicular to the film plane, divided by input light intensity. "On-axis optical gain loss" means, the reduction in optical gain observed relative to a given reference material. When expressed as a fraction, it is the optical gain for the sample of interest divided by the reference material optical gain. When expressed as a percentage, it is the percentage loss of optical gain relative to the reference material. "Redirecting" is defined as an optical property of an optical film to change the direction on incident light energy.

The term roughness average or $R_a$ means the average peak to valley height between the beads in the polymeric coating and is measured in by a profilometer and the result is expressed in micrometers. The term Ra is used to characterize the average roughness of a given area or on the surface area of an optical element.

The term optical element means surface structures on the surface of a substrate that have a positive profile. The surface structures are elements that perform a designated optical function such as redirection or diffusion or turning of incident light. The term light redirecting film means a thin film than perform the function of redirecting incident light into a desired output. Redirection can be either specular or diffuse. Examples of redirecting films include, but are not limited to turning films, diffusion films and retro-reflective films.

The term polymeric coating means an optically active layer that further modifies the light output of an optical element. The polymeric coating is applied to the surface of the surface structures.

The term polymeric coating means an optically active layer that further modifies the light output of an optical element. The polymeric coating is applied to the surface of the desired surface structures. The term variable thickness means the change in dry coating thickness as a function of location on the coated surface. The magnitude of the variable coating thickness exceeds the manufacturing variability typically encountered in coated polymers.

In order to accomplish a light directing film having high brightness and a wide angular viewing in display devices such as LCD TV, light redirecting film comprising a light source and a light redirecting polymeric film containing a structured surface on at least one side of the film and bearing a polymeric coating over at least part of the structured surface wherein the coating exhibits a variable thickness is preferred. By providing a polymer coating to the exposed surface area of the surface structures, the optical output of the surface structure is modified to provide a desired optical output. The polymer coating changes the geometry of the underlying surface structure changing the optical output. Providing a coating enables a quick, rapid changing of the optical properties of the underlying surface structure avoiding the need to tool expensive replication rollers utilize to provide precision, roll to roll surface structures common to display devices such as liquid crystal display devices. In addition, it has been found that the polymer coating provides an important level of protection to the underlying surface structure, providing a more robust, scratch and abrasion surface compared to optical structures that do not have polymer coatings.

In a preferred embodiment of the invention, the polymer film preferably has surface structure on both sides of the polymer film. Surface structure present on both sides provides an additional opportunity to modify the input light energy for the purposes of improving the efficiency of display devices. Additionally, a polymer film having a surface structure on both sides of the polymer film has been shown to provide a reduction in undesirable film-to-film wet-out reducing abrasion and Newton rings. Examples of surface structure pairs include a diffuser structure on one side opposed by a light redirecting feature or a light turning feature opposed by a light diffusing structure.

In another preferred embodiment, the maximum thickness of the polymeric coating is between 0.7 and 5.0 micrometers. Below 0.6 micrometers, little modification of the surface geometry is accomplish and is not cost justified. Above 6.0 micrometers, the coating is thick in comparison to the sizes of the preferred surface structures and difficult to dry.

In a preferred embodiment, the variable thickness has a range of at least 50% of the maximum thickness. For example, if the maximum thickness is 4.0 micrometers, then the variable thickness preferably will have a range of at least 2.0 micrometers. It has been shown that by covering light redirecting surface structures with a variable thickness layer the incident light energy is redirected over a wider angle compared to the same redirecting macrostructure without the variable polymer coating. Further, the angular brightness cut-off is softer and less abrupt compared to the same redirecting macrostructure without the variable polymer coating. In addition, the variable polymer coating has been shown to hide small cosmetic defects in the optical film, provide a reduction in Moiré compared to light redirecting surface structures without variable polymer coating which better obscures the backlight pattern from the viewer eye compared to light redirecting surface structures without variable polymer coating.

On-axis brightness and luminance angles are important determining factors in the contrast ratio of current LCD TV modalities. While increasing on-axis brightness has been shown to improve contrast ratio, angular brightness cut-off is hard. The invention provides a unique combination of high on-axis brightness while providing a soft angular cut-off and a much-improved angular distribution of light that provides excellent image quality to public display devices such as LCD monitors and TV.

Contemporary TV's typically have an on-axis peak luminance between 400-600 nits (candelas/m2), although the current TC06 standard states they may as low as 300 nits (50% of the brightest sets). It is well known that brighter pictures are typically associated with higher perceived image quality. Given this information, for applications which will be predominately used by one or two viewers, such as televisions located in bedrooms, it is preferable that the invention has an on-axis gain reduction of no more than 10%, or equivocally, have an on-axis gain value that is at least 90% of the reference material (for example, prismatic film). This allows for some flexibility in device placement and viewer location, while maintaining optimum image quality on-axis.

While many metrics such as contrast ratio are quoted out to 90 degrees off-axis, recent studies have shown that so far as image quality is concerned, 60 degrees off-axis in the horizontal scan direction is a more relevant limit for display viewing. Vertical viewing angle extent is less important than horizontal viewing extent as a consequence of display viewing habits. Given an on-axis gain reduction of not more than 10%, a corresponding off-axis gain improvement, of at least 30%, (or equivocally 130% of the reference material value) is desirable at 60 degree in the horizontal scan direction. An improvement in the vertical scan direction, at 40 degrees, is similarly desirable.

Additionally, it is preferable that rapid changes in luminance be avoided so the viewing experience is not drastically altered with small changes in viewing position; particularly in the horizontal scan direction. Therefore, the first derivative of the gain curve should not exceed 0.08 cd/m2/degree in the horizontal scan direction, out to a maximum angle of 60 degrees. Similarly, the first derivative of the gain curve should not exceed 0.08 cd/m2/degree in the vertical scan direction, out to a maximum angle of 40 degrees.

Figure 5:
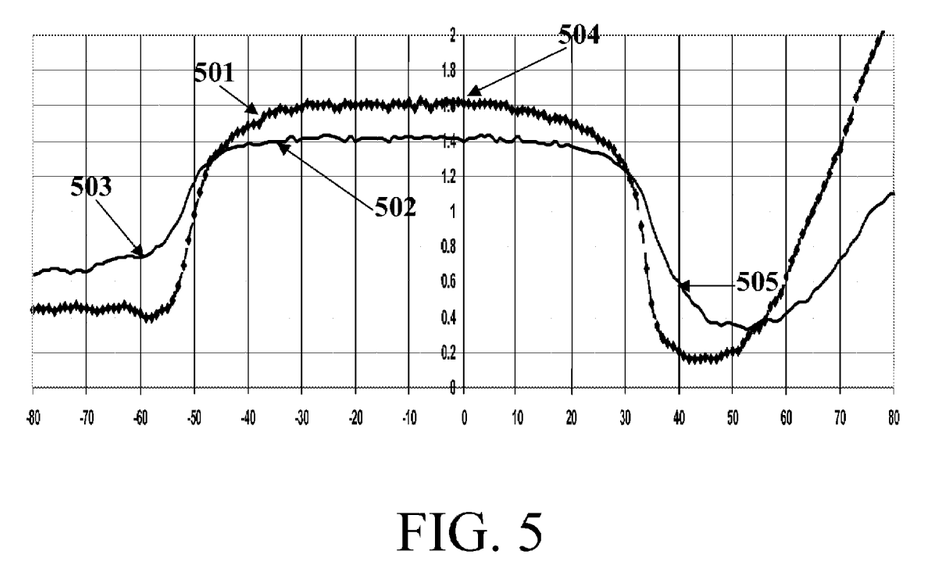
FIG. 5 is a graph of optical gain vs. viewing angle for inventive and comparative materials.

FIG. 5, Curve 501, shows the optical gain vs. viewing angle relationship for a collimating film (prismatic) currently used in the industry. Curve 502 is an example representative of the invention. Curves for the horizontal scan direction (−80<theta<80, phi=0) and vertical scan direction ((−80<theta<80, phi=90) of this type of optical film are typically symmetric about the center point (theta=0, phi=0, 90). So as to limit the amount of redundant information, the convention used in optical gain curves such as those in FIG. 5 is that −80 to 0 degrees on the x-axis represents horizontal scan information; 0 to 80 degrees on the x-axis represents vertical scan information.

Curve 501 has the characteristic high on-axis gain desirable for applications where on-axis viewing is the dominant observer mode but suffers from very steep (high first derivative values) luminance gain fall off both in the horizontal and vertical scan directions. It has undesirably low off-axis gain values at +/−60 degrees in the horizontal scan direction and +/−40 degrees in the vertical scan direction. An example of the invention, curve 502, has a lower on-axis gain position, but decreases much more slowly moving off-axis (low first derivative values), and has improved off-axis gain values at +/−60 degrees in the horizontal scan direction and +/−40 degrees in the vertical scan direction. Curve 502 illustrates the desirable balance between on-axis gain and off-axis gain improvements, commensurate with the viewing habits of small, intimate audiences.

Figure 6:
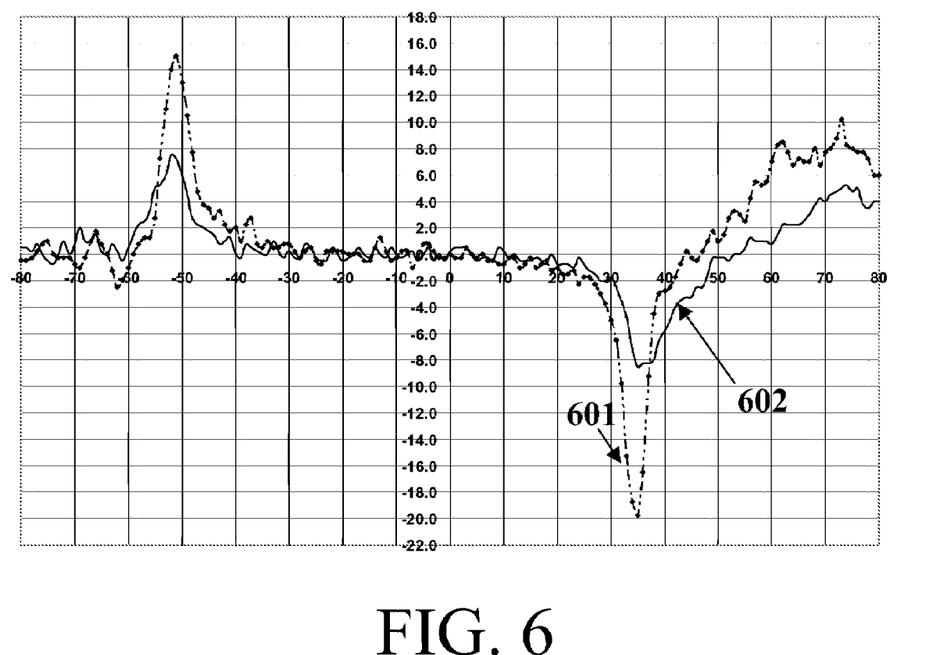
FIG. 6 is a graph of the first derivative of vs. viewing angle for the curves contained in FIG. 5.

The first derivative of the curves 501 and 502, are curves 601 and 602 respectively, shown in FIG. 6, using the same x-axis convention as described in FIG. 5. FIG. 6 demonstrates that the invention has luminance gain changes that vary much more slowly with viewing angle, both horizontally (+/−60 degrees) and vertically (+/−40), than the typical prismatic collimating film.

The preferred properties of the optical gain vs. viewing angle curves can be represented by parameters as outlined below:

1) So as to minimize the loss of image quality on-axis, optical gains relative to the uncoated reference film preferably is at least 90% (Point 504, FIG. 5).
2) So as to significantly improve off-axis luminance, the off-axis gain improvement at 60 degrees in the horizontal scan direction and 40 degrees in the vertical direction preferably is at least 130% of the reference film (Point 503 and 505 respectively).
3) So as to minimize the perceived luminance loss as a result of small changes in angular position, the change in luminance gain as a function of angle (the absolute value of the first derivative) is preferably no more than 0.08 cd/m$^2$/degree and 0.08 cd/m$^2$/degree in the horizontal and vertical scan directions respectively, out to angles +/−60 degrees off axis in the horizontal scan direction and +/−40 degrees in the vertical scan direction.

Preferred polymers for the variable thickness coating are polymers that can be coated using techniques well known in the art. Further, preferred polymer are one that can be coated out of water, are transparent, have a relatively low dielectric constant, form a film when dried and adhere well to the surface structures. Preferred polymers include polyurethane, polyvinyl alcohol, PVP, gelatin, and acrylic.

In a preferred embodiment of the invention, the polymeric coating is present of the surface of the surface structures in a pattern. A pattern-wise variable thickness coating provides a means to optically distinguish areas of the polymer from each other. Examples of desirable patterns include gradients for altering the optical output of the film across the film diagonal, width or length, spot patterns that are aligned with LCD pixels, or sufficient small patterns to frustrate Moiré patterns or reduce film wet-out.

In another preferred embodiment, the polymeric coating is present on the surface structure in a pattern. By patterning the variable polymeric coating on the surface of a surface structure, the output of each individual surface structure allowing for very small or fine adjustment of the optical modification. Examples of desirable patterns include stripes, dots and wiggled lines.

In another preferred embodiment, the polymeric coating further comprises polymers beads having an index of refraction difference between the polymer coating and the polymer beads of between 0.02 and 0.50. By providing small beads on the sides of the surface structures, the beads contained in a binder matrix reduce the slope of the angular luminance curve without unwanted scatter. In a preferred embodiment, the microbeads comprise polymers. Polymer beads tend to be less expensive than inorganic beads, typically have high light transmission and have been shown to adhere well to the surface structures with polymer binders such as polyurethane. Preferred bead materials include but not limited to polystyrene, PMMA, methyl methacrylate and ethyleneglycol dimethacrylate.

In a preferred embodiment, the micro beads are substantially circular. Circular micro beads have been found to provide excellent diffusion of incident light, can be easily coated and do not have sharp angular profiles that could result in abrasion of other adjacent optical components.

In another preferred embodiment, the micro-beads are elliptical. Elliptical microbeads have been shown to orient during coating and orient to the direction of some surface structures. Elliptical beads have also been shown to provide light output that can favor the major axis of the elliptical beads allowing for independent control of vertical and horizontal brightness.

In another preferred embodiment of the invention, the microbeads are present in two or more size distributions. By providing two or more size distributions of beads contained in the polymeric coating, the output of light can be further customized and fine-tuned to the desired output. Further, by providing a bead size that is larger than the surface structure, the large bead distribution provides an optical stand-off between adjacent optical components reducing possible abrasion, Newton rings and undesirable optical wet-out.

In a preferred embodiment, the polymeric coating forms a continuous layer over the entire surface of the underlying surface structure. The formation of a continuous layer of the entire surface of the underlying surface structure allows for protection of the underlying surface structure against abrasion and scratching. Further, the formation of a continuous layer allows for uniformization of the index of refraction, reducing unwanted scattering.

In another embodiment of the invention, the polymeric coating preferably covers between 20 and 80% of the structured surface. By partially covering the surface of the surface structures, a compromise position between light redirection and view angle can be obtained. By covering only a portion of the surface structures, light-redirecting geometry can be mostly preserved, while providing an improved viewing angle. An example would a coating that exists primarily in the valley areas between two opposing features. The apex angle area of the feature can be preserved for light redirecting while the coated valley areas can modify exit light to provide a wider viewing angle.

In one embodiment of the invention, the surface structures are preferably structures having a length, diameter or other major dimension of at least 25 micrometers that collimate incident light energy. In one embodiment of the invention, the macrostructure preferably comprises a prism. Prism structures have been shown to be efficient collimators of light and generally have two sloping surfaces that contain the nano-nodules. Light collimation generally is maximized when the included angle of the prism is between 88 and 92 degrees. In another preferred embodiment of the invention, the surface structures comprise individual surface structures having a ridgeline. Individual surface structures have been shown to reduce Moiré and improve brightness uniformity compared to regular prismatic structures.

The depths of the surface structures are preferably between 10 and 50 micrometers. The depth of the curved surface structures is measured from the ridge of the curved surface structures to the base of the curved surface structures. A depth less than 8 micrometer results in a light redirecting film with low on-axis brightness. A depth greater than 55 micrometers is difficult to manufacture and contains features large enough to create a Moiré pattern.

In a preferred embodiment, the surface structures preferably have a width of between 20 and 100 micrometers. When the surface structures have a width of greater than 130 micrometers, they become large enough that the viewer can see them through the liquid crystal display, detracting from the quality of the display. When the surface structures have a width of less than 12 micrometers, the width of the ridgeline of the feature takes up a larger portion of the width of the feature. This ridgeline is typically flattened and does not have the same light shaping characteristics of the rest of the surface structures. This increase in amount of width of the ridgeline to the width of the surface structures decreases the performance of the optical film. More preferably, the curved surface structures have a width of between 15 and 60 micrometers. It has been shown that this range provides good light shaping characteristics and cannot be seen by the viewer through a display. The specific width used in a display device design will depend, in part, on the pixel pitch of the liquid crystal display. The element width should be chosen to help minimize Moiré interference.

The length of the surface structures as measured along the protruding ridge is preferably between 800 and 3000 micrometers. As the long dimension lengthens the pattern becomes one-dimensional and a Moiré pattern can develop. As the pattern is shortened the screen gain is reduced and therefore is not of interest. This range of length of the curved surface structures has been found to reduce unwanted Moiré patterns and simultaneously provide high on-axis brightness.

In another preferred embodiment, the surface structures as measured along the protruding ridge is preferably between 100 and 600 micrometers. As the long dimension of the surface structures is reduced, the tendency to form Moiré patterns is also reduced. This range of surface structures length has been shown to significantly reduce unwanted Moiré patterns encountered in display devices while providing on-axis brightness.

The surface structures of the invention are preferably overlapping. By overlapping the curved surface structures, Moiré beneficial reduction was observed. Preferably, the curved surface structures of the invention are randomly placed and parallel to each other. This causes the ridges to be generally aligned in the same direction. It is preferred to have generally oriented ridgelines so that the film collimates more in one direction than the other which creates higher on-axis gain when used in a liquid crystal backlighting system. The curved surface structures are preferably randomized in such a way as to eliminate any interference with the pixel spacing of a liquid crystal display. This randomization can include the size, shape, position, depth, orientation, angle or density of the surface structures. This eliminates the need for diffuser layers to defeat Moiré and similar effects.

At least some of the surface structures may be arranged in groupings across the exit surface of the films, with at least some of the surface structures in each of the groupings having a different size or shape characteristic that collectively produce an average size or shape characteristic for each of the groupings that varies across the films to obtain average characteristic values beyond machining tolerances for any single optical element and to defeat Moiré and interference effects with the pixel spacing of a liquid crystal display. In addition, at least some of the surface structures may be oriented at different angles relative to each other for customizing the ability of the films to reorient/redirect light along two different axes. It is important to the gain performance of the films to avoid planar, un-faceted surface areas when randomizing features. Algorithms exist for pseudo-random placement of these features that avoid un-faceted or planar areas.

In one embodiment of the invention, the surface structures preferably have a cross section indicating a 90 degree included angle at the highest point of the feature. It has been shown that a 90-degree peak angle produces the highest on-axis brightness for the light redirecting film. The 90-degree angle has some latitude to it, it has been found that an angle of 88 to 92 degrees produces similar results and can be used with little to no loss in on-axis brightness. When the angle of the peak is less than 85 degrees or more than 95 degrees, the on-axis brightness for the light redirecting film decreases. Because the included angle is preferably 90 degrees and the width is preferably 15 to 30 micrometers, the curved wedge shaped features preferably have a maximum ridge height of the feature of between 7 and 30 micrometers. It has been shown that this range of heights of the wedge shaped elements provide high on-axis gain and Moiré reduction.

In another embodiment of the invention, the apex width preferably is greater than 90 and less than 130 degrees. It has been found that apex widths greater than 90 degrees and less than 130 degrees provide a softer-cut off than apex angles between 88 and 92 degrees.

The surface structures have an average pitch of between 10 and 55 micrometers. The average pitch is the average of the distance between the highest points of two adjacent features. The average pitch is different than the width of the features because the features vary in dimension and they are overlapping, intersecting, and randomly placed on the surface of the film to reduce Moiré and to ensure that there is no un-patterned area on the film. It is preferred to have less than 0.1% un-patterned area on the film, because un-patterned area does not have the same optical performance as the wedge shaped elements, leading to a decrease in performance.

In a preferred embodiment of the invention, the polymeric coating is thicker in the valley areas of the surface structure compared to the apex areas. It has been shown that by increasing the coating thickness in the valley areas of a light redirecting film, improvements in off-axis gain can be achieved with comparatively small losses in on-axis gain. It has been found that by providing a polymeric coating that is at least 75% thicker in the valley areas compared to all other areas in the film that the desirable improvement in off-axis gain and hence the widening of the viewing angle can be obtained.

Polymeric coatings that are conformal or that do not have a thickness difference have been found to be ineffective at improving off-axis gain and do not reduce the sharp drop in gain off axis. Preferably the polymeric coating forms and underlying surface structure comprises at least one surface having a radius between 2 and 25 micrometers. The curved surface has been shown to provide the desirable increase in off-axis gain and the reduction of the sharp gain reduction off axis, resulting in a film that redirects light over a wider angle compared to the same surface without a curved surface.

In another preferred embodiment, the polymeric coating has a surface roughness ($R_a$) of between 0.7 and 2.0 micrometers. Surface roughness in the polymeric coating has been found to add a diffusive component to the transmitted light. The surface roughness has been found to hide small cosmetic defects, which could be objectionable to users of LCD devices. Roughness average less than 0.50 micrometers does not add sufficient roughness to achieve the desired result. Roughness average greater than 2.5 provides a high level of diffusion, resulting in a loss in on-axis gain for light redirecting surface structures.

In a preferred embodiment of the invention, the polymeric coating preferably has an index of refraction difference between the polymeric coating and the polymer-structured surface of at least 0.05. By providing a refractive index difference of at least 0.05, the polymeric coating can be visually observed for the purposes of visually determining coating uniformity, which is important in the manufacturing of the invention materials.

Figure 2:
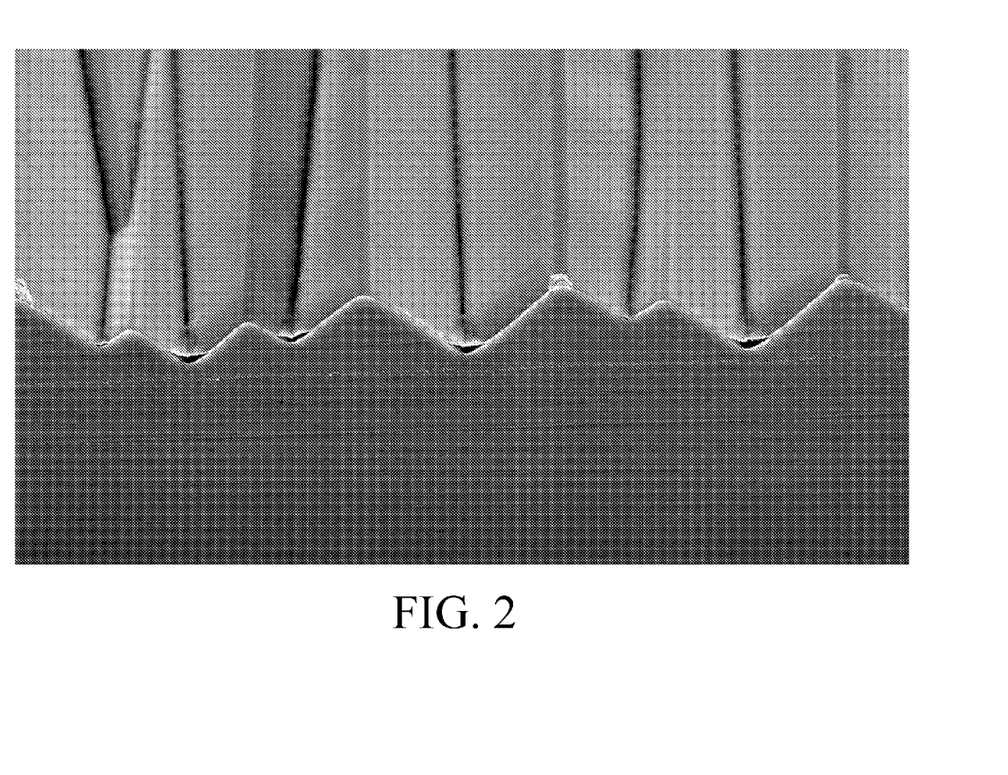
FIG. 2 is a magnified top schematic view of a microstructure in accordance with an example embodiment.

FIG. 2 shows a magnified side schematic view of a microstructure containing a conformal type coating of polymer. The polymer layer coated on the surface structure has a substantially uniform thickness and as a result, does not have the desired optical properties for wide viewing angle suitable for LCD TV.

Figure 3:
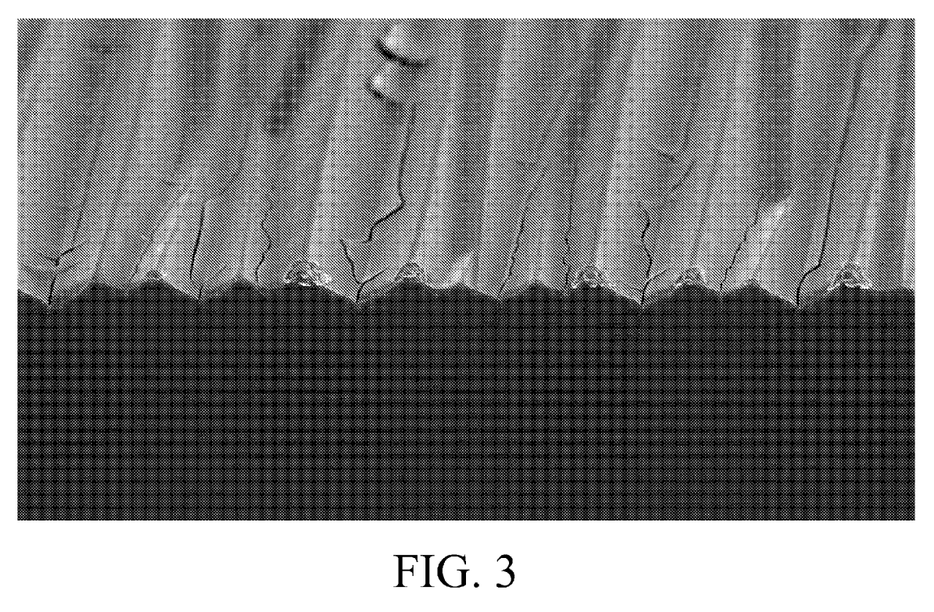
FIG. 3 is a magnified top schematic view of a microstructure in accordance with an example embodiment.

FIG. 3 shows a magnified side schematic view of a microstructure containing having coating of polymer with variable thickness. While the polymer layer in FIG. 3 does have variable thickness, the polymer has undesirable cracks in the valley areas of the microstructure.

Figure 4:
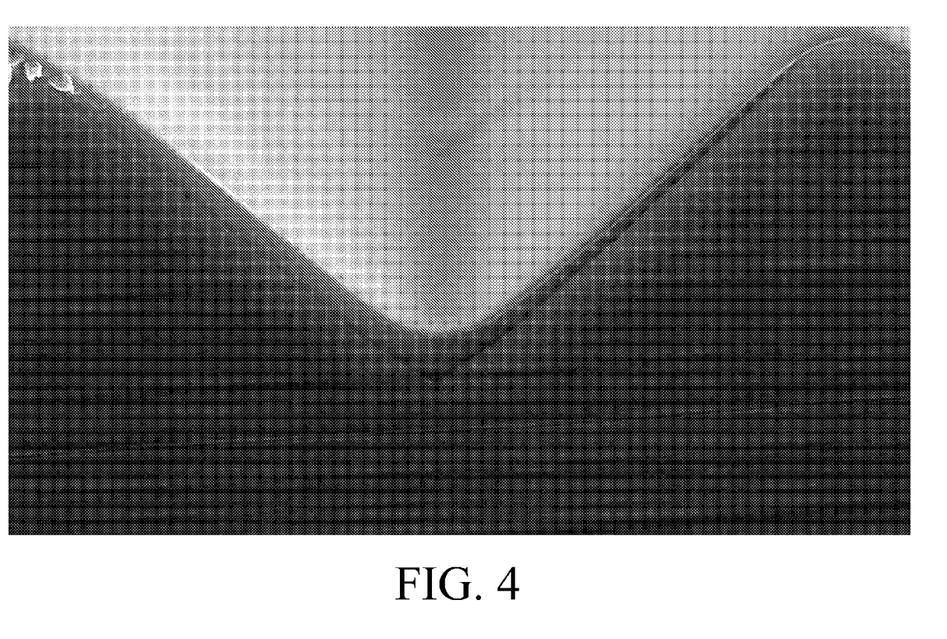
FIG. 4 is a magnified top schematic view of a microstructure in accordance with an example embodiment.

FIG. 4 shows a magnified side schematic view of a preferred microstructure containing a coating of polymer with variable thickness. The polymer layer coated on the surface structure has a preferred variable thickness with the thickness maximum located in the valley areas of the microstructures. The coating thickness decreases and tapers as the coating approaches the apex areas of the microstructure. The polymer coating is present on the apex areas of the microstructure. The coating predominately in the valley areas results in off-axis gain improvements but does not substantially affect the first derivative curve values.

Preferred polymers for the formation of the surface structures include polyolefins, polyesters, poly-esthers, polyamides, polycarbonates, cellulosic esthers, polystyrene, polyvinyl resins, polysulfonamides, polyethers, polyimides, polyvinylidene fluoride, polyurethanes, polyphenylenesulfides, polytetrafluoroethylene, polyacetals, polysulfonates, polyester ionomers, and polyolefin ionomers. Copolymers and/or mixtures of these polymers to improve mechanical or optical properties can be used. Preferred polyamides for the transparent complex lenses include nylon 6, nylon 66, and mixtures thereof. Copolymers of polyamides are also suitable continuous phase polymers. An example of a useful polycarbonate is bisphenol-A polycarbonate. Cellulosic esters suitable for use as the continuous phase polymer of the complex lenses include cellulose nitrate, cellulose triacetate, cellulose diacetate, cellulose acetate propionate, cellulose acetate butyrate, and mixtures or copolymers thereof. Preferably, polyvinyl resins include polyvinyl chloride, poly (vinyl acetal), and mixtures thereof. Copolymers of vinyl resins can also be utilized. Preferred polyesters of the invention include those produced from aromatic, aliphatic or cycloaliphatic dicarboxylic acids of 4-20 carbon atoms and aliphatic or alicyclic glycols having from 2-24 carbon atoms. Examples of suitable dicarboxylic acids include terephthalic, isophthalic, phthalic, naphthalene dicarboxylic acid, succinic, glutaric, adipic, azelaic, sebacic, fumaric, maleic, itaconic, 1,4-cyclohexanedicarboxylic, sodiosulfoisophthalic and mixtures thereof. Examples of suitable glycols include ethylene glycol, propylene glycol, butanediol, pentanediol, hexanediol, 1,4-cyclohexanedimethanol, diethylene glycol, other polyethylene glycols and mixtures thereof.

In a preferred embodiment of the invention, the surface structure preferably comprises polysulfone. Polysulfone is transparent, has a relatively high index of refraction and has a relative high $T_g$, all of which makes polysulfone an ideal polymer for use in LCD devices like LCD TV or LCD monitors.

In another preferred embodiment, the surface structures preferably have a surface tension between 32 and 55 dynes/cm as measured by ASTM D133. A surface tension between 32 and 55 dynes/cm has been shown to provide good to excellent adhesion between the polymer coating and the surface structures. Below 30 dynes/cm, adhesion is difficult to achieve. Preferably the surface energy difference between the surface structures and the polymer coating is less than 5 dynes/cm². This difference is an important factor in allowing the polymer to form a film exhibiting variable thickness prior to drying the polymer.

In another embodiment of the invention, the nano-nodules comprise a carbonate repeating unit. Polycarbonates have high optical transmission values that allows for high light transmission and diffusion. High light transmission provides for a brighter LC device than diffusion materials that have low light transmission values. Further polycarbonates have relatively high Tg suitable for LCD display applications. In further embodiment of the invention, the nano-nodules comprise a ester repeating unit. Polyesters are low in cost and have good strength and surface properties. Further, polyester polymer is dimensionally stable at temperatures between 80 and 200 degrees C. and therefore can withstand the heat generated by display light sources.

The size, shape and the distribution of the macrostructure are important in determining the distribution of light exiting the surface structures. Surface structures having an aspect ratio of between 0.5 and 6.0 are preferred. Surface structures with an aspect ratio less than 0.2 tend to have a small influence on increasing on-axis gain. Surface structures with an aspect ratio of greater than 6.0 are difficult to form utilizing melted polymer cast against patterned metallic roller, as the polymer tends to adhere to the surface of high aspect ratio features. Further, high pressure is required to fully form the high aspect ratio features significantly reducing tool life.

In one embodiment of the invention the surface structures have a repeating pattern. Repeating patterns generally provide low amounts of undesirable un-patterned area because repeating patterns have a relative high packing density compared to random surface structures. In another embodiment of the invention, the surface structures have a random pattern. While the random pattern does generally result in some un-patterned optical film because of the lower packing density compared to repeating patterns, a random pattern does generally result in lower levels of Moiré compared to repeating patterns. A random pattern has also been shown to hide or obscure small film defects from the viewer eye.

In another embodiment of the invention, the surface structures have a length, diameter or other dimension of at least 100 micrometers. A microstructure having a dimension greater than 100 micrometers provides the desired collimation for incident light required to provide an on-axis gain greater than 1.0. Further, microstructures that do not have a dimension greater than 100 micrometers are more difficult to manufacture and because of there size can result in unwanted un-patterned area on the optical film.

Light redirecting surface structures having an apex angle of approximately 90 degrees generally reject incident light at off axis angles and allow at or near on-axis to be transmitted. Typically, a plot of angle vs. luminance for a collimation macrostructure shows a peak luminance at or near 0 degree followed by a reduction in luminance as the angle approaches 90 degrees. The slope of the luminance reduction is a function of macrostructure geometry. It has been found that by providing a roughness on the surface of the surface structures that the change in slope can be dramatically altered to provide increased luminance over a wider range of angles.

Figure 1:
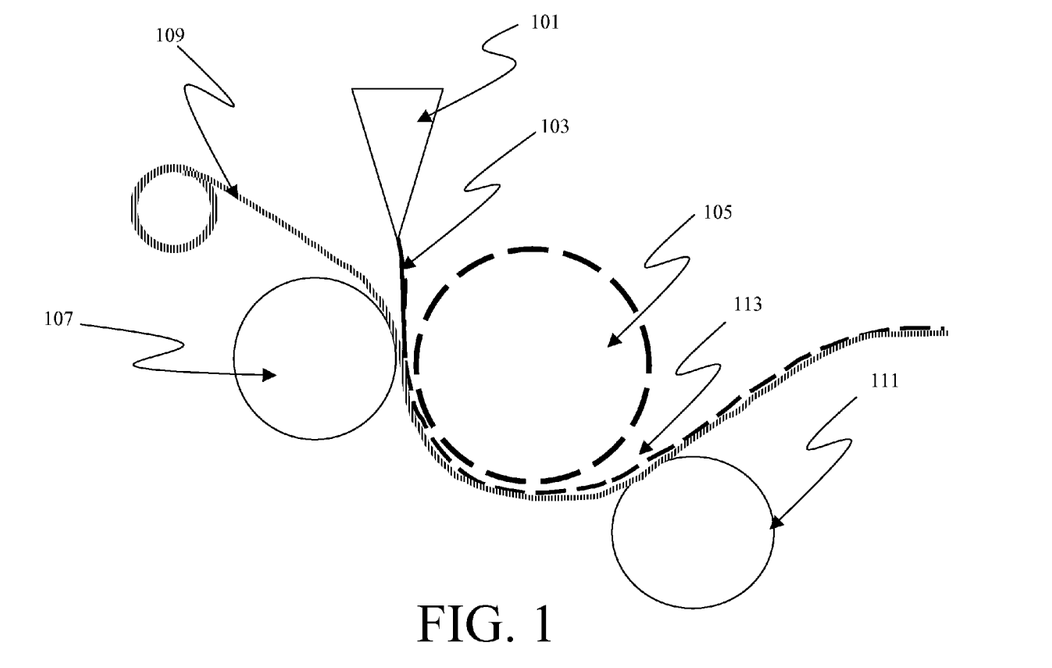
FIG. 1 is a simplified schematic diagram of an apparatus for fabricating optical films in accordance with an example embodiment.

FIG. 1 is a simplified schematic diagram of an apparatus for fabricating the optical film such as described in connection with FIGS. 2-4. The apparatus includes an extruder 101, which extrudes a material 103. The apparatus also includes a patterned roller 105 that contains surface structures that forms the optical features in the optical layer 113. Additionally, the apparatus includes a pressure roller 107 that provides pressure to force material 103 into patterned roller 105 and stripping roller 111 that aids in the removal of material 103 from patterned roller 105.

In operation, a base layer 109 is forced between the pressure roller 107 and the patterned roller 105 with the extruded material 103. In an example embodiment, the base layer 109 is an oriented sheet of polymer. Moreover, the material 103 forms the optical layer 113, which includes optical features after passing between the patterned roller 105 and the pressure roller 107. Alternatively, an adhesion layer may be co-extruded with the material 103 at the extruder 101. Co-extrusion offers the benefit of two or more layers. The co-extruded adhesion layers can be selected to provide optimum adhesion to the base layer 109 and the optical layer 113 creating higher adhesion than a mono-layer. Accordingly, the co-extruded adhesion and optical layers are forced with the base layer between the pressure roller 107 and the patterned roller 105. After passing between the pressure roller 107 and the patterned roller 105, a layer 113 is passed along a roller 111.

In another preferred embodiment, the material 103 comprises a co-extruded layer of polymer having a skin layer that contacts the pattered roller 105 that has a melt index that is 50% greater than the remaining layers in the co-extruded structure. It has been found that a high flow skin layer aids in the replication fidelity of the polymer. The layers other than the skin layer may have a much lower melt index, resulting in a mechanically stiffer optical film that is better suited to withstand the rigors of display devices.

In a preferred embodiment, a light redirecting polymeric film is coated with a polymer coating using curtain coating, x-hopper coating or spray coating. Surface contact coating techniques such as gravure coating or roll coating have been found to apply the coating primarily to the apex areas of the light redirecting features. Preferably, the formation of the structures polymer film and the subsequent coating of the surface structures are accomplished on-line or sequentially to reduce manufacturing cost and reduce manufacturing defects associated with unwinding and winding of web materials.

The invention may be used in conjunction with any liquid crystal display devices, typical arrangements of which are described in the following. Liquid crystals (LC) are widely used for electronic displays. In these display systems, an LC layer is situated between a polarizer layer and an analyzer layer and has a director exhibiting an azimuthal twist through the layer with respect to the normal axis. The analyzer is oriented such that its absorbing axis is perpendicular to that of the polarizer. Incident light polarized by the polarizer passes through a liquid crystal cell is affected by the molecular orientation in the liquid crystal, which can be altered by the application of a voltage across the cell. By employing this principle, the transmission of light from an external source, including ambient light, can be controlled. The energy required to achieve this control is generally much less than that required for the luminescent materials used in other display types such as cathode ray tubes. Accordingly, LC technology is used for a number of applications, including but not limited to digital watches, calculators, cameras portable computers, electronic games for which light weight, low power consumption and long operating life are important features. Additionally, LCD displays are useful for TVs, computer monitors, gaming displays, automotive displays, picture frames, appliance displays, point-of-purchase displays and the like.

In a preferred embodiment, the display comprises a LCD that typically would benefit from an improved viewing angle compared to display devices that have a narrow viewing angle. Preferred examples of a LCD devices that typically would benefit from a wide viewing angle includes TV, computer monitor, picture frame, public information displays, point of purchase displays and gaming displays. The wider viewing angle allows for even illumination through out a wider viewing angle compared to prior art collimated displays. In these displays, the film of the invention is located between the liquid crystal cell and the backlight source. The film spreads light into a wide cone allowing for even illumination. It is recognized that the viewing angle can be constrained by the liquid cell aperture geometry, compensation film technology and type of backlight source.

Active-matrix liquid crystal displays (LCDs) use thin film transistors (TFTs) as a switching device for driving each liquid crystal pixel. These LCDs can display higher-definition images without cross talk because the individual liquid crystal pixels can be selectively driven. Optical mode interference (OMI) displays are liquid crystal displays, which are "normally white," that is, light is transmitted through the display layers in the off state. Operational mode of LCD using the twisted nematic liquid crystal is roughly divided into a birefringence mode and an optical rotatory mode. "Film-compensated super-twisted nematic" (FSTN) LCDs are normally black, that is, light transmission is inhibited in the off state when no voltage is applied. OMI displays reportedly have faster response times and a broader operational temperature range.

The optical film of the present invention can even out the luminance when the film is used as a light-scattering film in a backlight system. Back-lit LCD display screens, such as are utilized in portable computers, may have a relatively localized light source (ex. fluorescent light) or an array of relatively localized light sources disposed relatively close to the LCD screen, so that individual "hot spots" corresponding to the light sources may be detectable. The diffuser film serves to even out the illumination across the display. The liquid crystal display device includes display devices having a combination of a driving method selected from e.g. active matrix driving and simple matrix drive and a liquid crystal mode selected from e.g. twist nematic, supertwist nematic, ferroelectric liquid crystal and antiferroelectric liquid crystal mode, however, the invention is not restricted by the above combinations. In a liquid crystal display device, the oriented film of the present invention is necessary to be positioned in front of the backlight. The optical film of the present invention can even the lightness of a liquid crystal display device across the display because the film has excellent light-scattering properties to expand the light to give excellent visibility in all directions. Although the above effect can be achieved even by the single use of such film, plural number of films may be used in combination. The homogenizing film may be placed in front of the LCD material in a transmission mode to disburse the light and make it much more homogenous.

The present invention has a significant use as a light source destructuring device. In many applications, it is desirable to eliminate from the output of the light source itself the structure of the filament, which can be problematic in certain applications because light distributed across the sample will vary, and this is undesirable. Also, variances in the orientation of a light source filament or arc after a light source is replaced can generate erroneous and misleading readings. A homogenizing film of the present invention placed between the light source and the detector can eliminate from the output of the light source any trace of the filament structure and therefore causes a homogenized output which is identical from light source to light source.

The optical film may be used to control lighting for stages by providing pleasing homogenized light that is directed where desired. In stage and television productions, a wide variety of stage lights must be used to achieve all the different effects necessary for proper lighting. This requires that many different lamps be used which is inconvenient and expensive. The films of the present invention placed over a lamp can give almost unlimited flexibility dispersing light where it is needed. As a consequence, almost any object, moving or not, and of any shape, can be correctly illuminated.

A reflection film can be formed by applying a reflection layer composed of a metallic film, etc., to the light exit surface of the optical film of the present invention and can be used e.g. as a retroreflective member for a traffic sign. It can be used in a state applied to a car, a bicycle, person, etc.

The optical film of the present invention may also be used in the area of law enforcement and security systems to homogenize the output from laser diodes (LDs) or light emitting diodes (LEDs) over the entire secured area to provide higher contrasts to infrared (IR) detectors. The films of the present invention may also be used to remove structure from devices using LED or LD sources such as in bank note readers or skin treatment devices. This leads to greater accuracy.

Fiber-optic light assemblies mounted on a surgeon's headpiece can cast distracting intensity variations on the surgical field if one of the fiber-optic elements breaks during surgery. A optical film of the present invention placed at the ends of the fiber bundle homogenizes light coming from the remaining fibers and eliminates any trace of the broken fiber from the light cast on the patient. A standard ground glass diffuser would not be as effective in this use due to significant backscatter causing loss of throughput.

The optical films of the present invention can also be used to homogeneously illuminate a sample under a microscope by destructuring the filament or arc of the source, yielding a homogeneously illuminated field of view. The films may also be used to homogenize the various modes that propagate through a fiber, for example, the light output from a helical-mode fiber.

The optical films of the present invention also have significant architectural uses such as providing appropriate light for work and living spaces. In typical commercial applications, inexpensive transparent polymeric diffuser films are used to help diffuse light over the room. A homogenizer of the present invention, which replaces one of these conventional diffusers, provides a more uniform light output so that light is diffused to all angles across the room evenly and with no hot spots.

The optical films of the present invention may also be used to diffuse light illuminating artwork. The transparent polymeric film diffuser provides a suitable appropriately sized and directed aperture for depicting the artwork in a most desirable fashion.

Further, the optical film of the present invention can be used widely as a part for optical equipment such as a displaying device. For example, it can be used as a light-reflection plate laminated with a reflection film such as a metal film in a reflective liquid crystal display device or a front scattering film directing the film to the front-side (observer's side) in the case of placing the metallic film to the back side of the device (opposite to the observer), in addition to the aforementioned light-scattering plate of a backlight system of a liquid crystal display device. The optical film of the present invention can be used as an electrode by laminating a transparent conductive layer composed of indium oxide represented by ITO film. If the material is to be used to form a reflective screen, e.g. front projection screen, a light-reflective layer is applied to the transparent polymeric film diffuser.

Another application for the optical film is a rear projection screen, where it is generally desired to project the image from a light source onto a screen over a large area. The viewing angle for a television is typically smaller in the vertical direction than in the horizontal direction. The optical film acts to spread the light to increase viewing angle.

Embodiments of the invention may provide not only improved light diffusion and collimation but also an optical film of reduced thickness, that has reduced light absorption tendencies, that exhibits a soft angular cut-off, or that exhibits reduced Moiré or Newton rings in an LCD display system.

The invention has been described in detail with particular reference to certain preferred embodiments thereof, but it will be understood that variations and modifications can be effected within the spirit and scope of the invention.

The following examples illustrate the practice of this invention. They are not intended to be exhaustive of all possible variations of the invention. Parts and percentages are by weight unless otherwise indicated.

EXAMPLE

In this example a polycarbonate base sheet containing individual integral optical elements that were 1200 micrometers in length, 35 micrometers in width and 27 micrometers in height having an apex angle of approximately 90 degrees were coated with several discontinuous optical modification layers. Thirteen-inch wide micro replicated polycarbonate support manufactured by Eastman Kodak Company, Rochester, N.Y., were coated to produce the enhanced wide-angle appearance having a softer angular cut-off compared to the same optical elements without the variable thickness layer. This example will demonstrate the advantaged optical properties of a structured surface containing a polymer coating of variable thickness.

To make the bone gelatine 1-kilogram dispersion that was coated onto the micro replicated polycarbonate support, 988.3 grams of water and 11.7 grams of photographic gelatin were added together, along with a small amount of surfactant to aid in the bead coating process. This total dispersion was heated to 50° C.

The gelatin and matte bead dispersion was liquefied at 50 degrees Celsius (C), coated onto the micro replicated polycarbonate support at a wet coverage of 38.1 $cm^3/m^2$ and then dried.

To make the PVP 1-kilogram dispersion that was coated onto the micro replicated polycarbonate support, 901.1 grams of distilled water and 98.9 grams of PolyVinylPyrrolidone (PVP), with an average Molecular Weight 10,000 was obtained from Sigma-Aldrich, Saint Louis, Mo., was added together. The PVP material was dispersed into a distilled water solution with its concentration at 9.9%. In this embodiment, the PVP has an average viscosity about 10 cp when employed in a 10% aqueous solids solution at 20° C. This total dispersion was kept at room temperature and allowed to stir for approximately one hour prior to coating. The PVP and water dispersion was coated onto the micro replicated polycarbonate support at a wet coverage of 38.1 $cm^3/m^2$ and then dried.

To make the PVA 1-kilogram dispersion that was coated onto the micro replicated polycarbonate support, 788 grams of distilled water and 212 grams of GH-23 PolyVinyl Alcohol obtained from Nippon Gohsei Corporation, La Porte, Tex. was added together. The GH-23 material was dispersed into a distilled water solution with its concentration at 14.3%. In this embodiment, the poly(vinyl alcohol) has an average viscosity about 52 cp when employed in a 4% aqueous solids solution at 20° C. This total dispersion was kept at room temperature and allowed to stir for approximately one hour prior to coating.

To make the PVA 1-kilogram dispersion without matte beads that was coated onto the micro replicated polycarbonate support, 835.9 grams of distilled water and 164.1 grams of GH-17 PolyVinyl Alcohol obtained from Nippon Gohsei Corporation, La Porte, Tex. was added together. The GH-17 material was dispersed into a distilled water solution with its concentration at 17.3%. In this embodiment, the poly(vinyl alcohol) has an average viscosity about 30 cp when employed in a 4% aqueous solids solution at 20° C. This total dispersion was kept at room temperature and allowed to stir for approximately one hour prior to coating.

To make the latex 1-kilogram dispersion that was coated onto the micro replicated polycarbonate support, 885.4 grams of distilled water and 114.6 grams of WitcoBond® W-320 Latex obtained from Chemtura Corporation, Middlebury Conn. was added together. The WitcoBond® W-320 Latex is an aqueous polyurethane dispersion with a glass transition temperature of −15° C. and a 720% elongation at break. This total dispersion was kept at room temperature and allowed to stir for approximately one hour prior to coating.

The above latex dispersions were coated onto the polycarbonate replicated support containing the individual optical elements utilizing a slot coater and 20 meter horizontal drying section heated to 100 C. The examples 1-8 were coated at 10 meters/min. The coated and dried examples were then characterized for their optical performance using an EZ Contrast 160 ELDIM. On-axis optical gain loss, H/V off-axis gain improvements and maximum first derivative value were calculated from the horizontal and vertical scan curved generated by the ELDIM. Table 1 below contains the binder type, binder coverage and optical results and appearance.

TABLE 1

| Example | Binder | Binder Coverage (mg/m²) | On-axis Optical Gain Loss | H/V Off-axis Gain Improvement (at 60H/40V degrees) | Maximum First Derivative Value, H/V Scan Direction (0 to 60H/0 to 40V degrees) | Appearance |
|---|---|---|---|---|---|---|
| 1 | Gelatin | 442 | 0.97 | 1.15/1.16 | 0.11/0.13 | Acceptable |
| 2 | PVP | 3767 | NA | NA | NA | Unacceptable |
| 3 | PVA, GH-17 | 1528 | 0.92 | 1.34/1.65 | 0.07/0.08 | Acceptable |
| 4 | PVA, GH-23 | 1528 | NA | NA | NA | Unacceptable |
| 5 | Witcobond W-320 | 1528 | 0.88 | 1.34/1.77 | 0.04/0.06 | Acceptable |
| 6 | Witcobond W-320 | 215 | 0.92 | 1.26/1.35 | 0.07/0.11 | Acceptable |

The appearance shown in Table 1 was a visual determination of the coated layer as it was exiting the machine dryers. An acceptable grade indicated that some streaks or other common coating defects may be present but the overall appearance would be uniform enough to measure on-axis optical gain loss and off-axis optical gain improvement. An unacceptable grade indicates that the overall appearance is not acceptable due to streaks, mottle appearance or other coating defects. If the appearances grade is unacceptable, no luminance gain values were measured since the data would be distorted due to the non-uniform appearance. Further, the unacceptable appearance would result in undesirable non-uniformity in an LCD TV significantly reducing the commercial value of the optical film.

Example 1 did not meet the desired optical performance characteristic because the horizontal/vertical off axis gain improvement at 60 degrees in the horizontal and 40 degrees in the vertical were 1.15 and 1.16 respectively compared to a preferred value of at least 1.30. Further the maximum first derivative value horizontal/vertical scan were 0.11 and 0.13 respectively compared to a preferred value of less than 0.08. Integrating all of the data for example 1, while the coating appearance was acceptable and the on-axis optical gain loss was acceptable, the off-axis improvements were not sufficient and the cut-off was too sharp.

Example 2 exhibited an uneven coating and poor appearance resulting in a sample that was too variable in optical output to reliability measure. Example met all of the preferred optical targets and performed well as an optical film to improve the viewing angle of an LCD TV compared to prior art light redirecting films. FIG. 4 is a magnified side view of example 3. The PVA coating can be observed in the valley areas between the surface structure and the variable coating thickness can be observed with the maximum thickness being located in the valley areas.

Example 4 exhibited an uneven coating and poor appearance resulting in a sample that was too variable in optical output to reliability measure. Example 5 did not meet the desired optical performance characteristic because the on-axis optical gain loss was 0.88 compared to a preferred value of greater than 0.90. The off-axis optical characteristics of example 4 were acceptable, but too much light was loss on axis to sufficiently illuminate a LCD TV on axis.

Example 6 did not meet the desired optical performance characteristic because the maximum first derivative value H/V scan was 0.11 in the vertical compared to a preferred value of less than 0.08. Integrating all of data from Table 1, Example 3 met all of the preferred optical output values. As can be seen from the data in Table 1, just the presence of a polymer coating is not enough to obtain the desired optical results. The variable polymer thickness in Example 3 in an important factor in the desired optical output characteristics.

The invention has been described in detail with particular reference to certain preferred embodiments thereof, but it will be understood that variations and modifications can be effected within the spirit and scope of the invention. The patents and publications identified herein are incorporated by reference.

PARTS LIST 101 extruder
103 material
105 patterned roller
107 pressure roller
109 base layer
111 stripping roller
113 layer
501 gain curve for conventional prismatic film
502 gain curve for inventive material inventive
503 horizontal reference point (−60°)
504 conventional gain at 0°
505 vertical reference point (+40°)
601 first derivative of curve 501 (conventional)
602 first derivative of curve 502 (invention)

The invention claimed is:

1. A display comprising a light source for providing light and a light guide plate for receiving and outputting the light towards a collimating light redirecting polymeric film, the collimating light redirecting polymeric film containing a structured surface on at least one side of the film and bearing a polymeric coating over at least part of the structured surface wherein the coating exhibits a variable thickness.

2. The display of claim 1 wherein the polymeric film has a structured surface on opposite sides of the film.

3. The display of claim 1 wherein the maximum thickness of the polymeric coating is between 0.7 and 5.0 micrometers.

4. The display of claim 1 wherein the variable thickness has a thickness range of at least 50% of the maximum thickness of the polymeric coating.

5. The display of claim 1 wherein the polymeric coating is selected from the group consisting of polyurethane, polyvinyl alcohol, acrylic and PVP resins.

6. The display of claim 1 wherein the polymeric coating is on the polymeric film in a pattern.

7. The display of claim 1 wherein the polymeric coating is present on the structured surface in a pattern.

8. The display of claim 1 wherein the polymeric coating further comprises polymer beads having an index of refraction difference between the polymeric coating and the polymer beads of between 0.02 and 0.50.

9. The display of claim 1 wherein the polymer coating forms a continuous layer over the structured surface.

10. The display of claim 1 wherein the polymeric film has a light entry side and an opposing light exit side.

11. The display of claim 1 wherein the structured surface comprises linear prismatic structures.

12. The display of claim 1 wherein the polymeric coating covers substantially the entire structured surface.

13. The display of claim 1 wherein the structured surface comprises individual optical elements each having a ridgeline.

14. The display of claim 13 wherein the individual optical elements further comprise valley areas located between the ridgeline areas.

15. The display of claim 14 wherein the polymeric coating is thicker in the valley areas compared to the ridgeline areas.

16. The display of claim 14 wherein the polymeric coating is at least 75% thicker in the valley areas compared to the ridgeline areas.

17. The display of claim 14 wherein the polymeric coating is at least 50% thicker on opposing faces of the individual optical elements compared to the valley areas.

18. The display of claim 11 wherein the individual elements form an apex angle between 88 and 92 degrees, have a height between 10 and 75 micrometers and a height to width aspect ratio of between 0.5 and 5.0.

19. The display of claim 13 wherein the polymeric coating forms a curved surface in valley areas having a radius of curvature difference between the valley areas of structured surface and the polymer coating of between 2 and 25 micrometers.

20. The display of claim 1 wherein the structured surface comprises polysulfone.

21. The display of claim 1 wherein the structured surface contains individual elements having a surface energy of between 32 and 55 dynes/cm.

22. The display of claim 1 wherein the polymeric coating has a surface roughness of between 0.2 and 1.0 micrometers.

23. The display of claim 1 wherein the polymeric coating has an index of refraction difference between the polymeric coating and the structured surface of at least 0.05.

24. The display of claim 1 wherein the polymeric film has an on-axis optical gain loss between 0.90 and 0.98.

25. The display of claim 1 wherein the polymeric film has an on-axis optical gain loss greater than 0.88 and an off-axis gain improvement in the horizontal greater than 1.30.

26. The display of claim 1 wherein the polymeric film has an on-axis optical gain loss greater than 0.88, an off-axis gain improvement in the horizontal greater than 1.30 and a maximum first derivative in the horizontal less than 0.09.

27. The display of claim 1 wherein the polymeric film has an on-axis optical gain loss greater than 0.88, an off-axis gain improvement in the vertical greater than 1.30 and a maximum first derivative in the vertical less than 0.09.

28. The display of claim 1 wherein the polymeric film has an on-axis optical gain loss between 0.90 and 0.94, an off axis gain improvement in the horizontal between 1.3 and 1.6, a maximum first derivative in the horizontal between 0.03 and 0.09 and a maximum first derivative in the vertical between 0.04 and 0.09.

* * * * *